United States Patent
Mujica

(10) Patent No.: US 7,123,671 B2
(45) Date of Patent: Oct. 17, 2006

(54) AUTOMATIC GAIN CONTROL METHOD FOR DIGITAL SUBSCRIBER LINE MODEMS

(75) Inventor: Fernando A. Mujica, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 761 days.

(21) Appl. No.: 09/966,054

(22) Filed: Sep. 28, 2001

(65) Prior Publication Data

US 2003/0076906 A1     Apr. 24, 2003

(51) Int. Cl.
H04L 27/08 (2006.01)

(52) U.S. Cl. .................................... 375/345

(58) Field of Classification Search ............... 375/345; 379/27, 29; 370/430, 480, 282, 295; 327/30; 330/279, 133, 134; 455/232.1, 251.1, 234.1
See application file for complete search history.

(56) References Cited

U.S. PATENT DOCUMENTS

| | | | |
|---|---|---|---|
| 5,036,527 A * | 7/1991 | Halim et al. ............... | 375/345 |
| 6,058,162 A * | 5/2000 | Nelson et al. ............ | 379/22.04 |
| 6,073,848 A * | 6/2000 | Giebel .................... | 235/462.26 |
| 6,480,068 B1 * | 11/2002 | Mujica et al. ............. | 330/279 |
| 6,498,927 B1 * | 12/2002 | Kang et al. .............. | 455/245.2 |

* cited by examiner

Primary Examiner—Dac Ha
Assistant Examiner—Jaison Joseph
(74) Attorney, Agent, or Firm—Steven A. Shaw; W. James Brady; Frederick J. Telecky, Jr.

(57) ABSTRACT

The present invention provides automatic gain control (AGC) for a wide variety of conditions encountered in DSL scenarios. In particular, the proposed AGC approach addresses the problem of analog front end saturation in which a plurality of gain stages (i.e., programmable gain amplifiers) and filter stages are interleaved with inaccessible intermediate points. The gain settings of each of the PGAs is increased (614) until the received signal exceeds a given threshold (620) or until the maximum setting for that PGA has been reached (624). If the current PGA setting has been maximized, the next PGA is considered (628) and the process is repeated until no additional gain is needed or until the available PGAs are exhausted. This process is iterated (630) with different maximum PGA settings for each iteration to enable a more uniform gain distribution. Additionally, the order in which the PGAs are considered can be selected, based on the type of communication loop determined (218) to be coupling the analog front end, to improve over performance.

15 Claims, 2 Drawing Sheets

AUTOMATIC GAIN CONTROL METHOD FOR DIGITAL SUBSCRIBER LINE MODEMS

RELATED APPLICATIONS

Cross reference is made to commonly assigned U.S. patent application Ser. No. 09/966,055 entitled "Hardware Assisted Automatic Gain Control For Digital Subscriber Line Modems", the teaching of which being incorporated herein by reference and filed herewith.

BACKGROUND OF THE INVENTION

1. Technical Field of the Invention

The present invention relates generally to the field of telecommunications and, more particularly, to signal processing in subscriber line modems.

2. Description of the Related Art

The rapid increase in use and popularity of the Internet has motivated research and development of systems directed to advanced communication of information between remotely located computers, particularly in effecting higher bit-rates using existing infrastructure. One type of technology arising from this development is referred to in the art as digital subscriber line (DSL). DSL refers generically to a public network technology that delivers relatively high bandwidth over conventional telephone copper wiring at limited distances. DSL has been further separated into several different categories of technologies according to particular expected data transfer rate, the type and length of medium over which data is communicated, and the schemes for encoding and decoding the communicated data. A DSL system can be considered as a pair of communicating modems, one of which is located at a client site, such as a home or office computer, and the other of which is located at a network control site, typically a telephone central office.

One type of DSL technology is referred to as Asymmetric Digital Subscriber Line (ADSL) and corresponds to the ANSI standard T1.43. ADSL technology encompasses communication according to Discrete Multitone (DMT) modulation and also includes frequency domain multiplexing (FDM), other modulation techniques are also known in the art. ADSL systems can communicate data over a single copper twisted pair at downstream (central office to remote client) rates on the order of 100 times that conventional voice band modem rates. For example, ADSL can utilize a downstream signal bandwidth of 25 kHz to 1100 kHz and an upstream signal bandwidth of 25 kHz to 138 kHz. Signal echo problems in this type of communication system are especially noticeable at the remote client modems, since its transmission bandwidth is within the bandwidth of its received traffic. Even in a FDM system, leakage of the upstream energy into the downstream band causes signal echo problems.

Because of the nature of ADSL communications, mixed signal circuitry is required in the implementation of ADSL modems, both for the central office and also for the remote clients in which both analog and digital signals are handled. Conventional ADSL modem designs include functions referred to as analog front ends in which operations such as digital-to-analog and analog-to-digital conversion, amplification/attenuation and filtering is performed. Because of the frequencies involved in ADSL technology, which can range from tens of kHz to MHz frequencies, and because of the large dynamic range required in order to accommodate the wide variations in length and schemes for subscriber loops, the amplification and filtering can be vary complex, particularly in an integrated circuit.

Analog amplification or attenuation is typically needed in the received path of most digital modems to fully utilize the available digital dynamic range. Typically, the gain adjustment depends on the particular channel conditions, therefore, automatic gain control is preferable. In cases where all the analog filtering is performed before all programmable gain attenuation/amplification (PGA) stage(s), the task of an automatic gain controller is greatly simplified as saturation conditions at the output of the filtering stages are readily observable in the digital domain. On the other hand, when the PGA and filtering stages are interleaved (typical in integrated analog front ends) the automatic gain controller problem is a difficult one since, in most environments, the intermediate points in the receive path are inaccessible.

Therefore, there is a need for an automatic gain control approach for digital subscriber line modems targeted to analog front end (AFE) designs with interleaved gain and filtering stages in which the intermediate points in the receive path are inaccessible.

SUMMARY OF THE INVENTION

The present invention achieves technical advantages as a method and system of providing automatic gain control (AGC) for a wide variety of conditions encountered in DSL scenarios. In particular, the proposed AGC approach addresses the problem of analog front end saturation in which a plurality of gain stages (i.e., programmable gain amplifiers) and filter stages are interleaved with inaccessible intermediate points. The gain settings of each of the PGAs is increased until the received signal exceeds a given threshold or until the maximum setting for that PGA has been reached. If the current PGA setting has been maximized, the next PGA is considered and the process is repeated until no additional gain is needed or until the available PGAs are exhausted. This process is iterated with different maximum PGA settings for each iteration to enable a more uniform gain distribution. Additionally, the order in which the PGAs are considered can be selected, based on the type of communication loop coupling the analog front end, to improve over performance.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
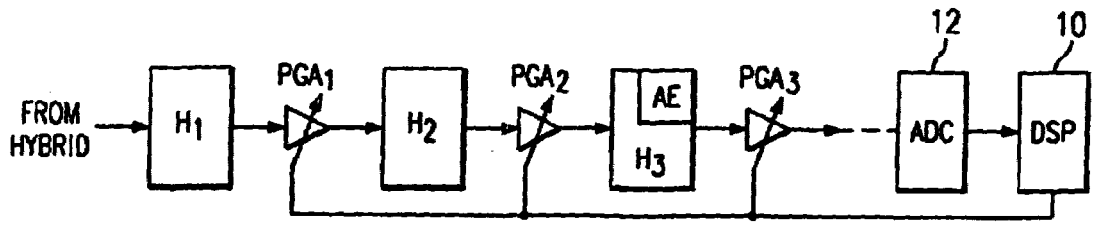
FIG. 1 illustrates a distributed filter and programmable gain amplifier arrangement in an integrated analog front end.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

The following embodiments of the present invention are directed to an AGC algorithm for digital subscriber line (DSL) modems with analog front end (AFE) designs where the gain and filtering stages are interleaved in which it is assumed that the intermediate points in the receive path are inaccessible. The present AGC algorithm estimates out-of-band received energy and enables appropriate actions to minimize or eliminate AFE saturation. Throughout the drawings, it is noted that the same reference numerals or letters will be used to designate like or equivalent elements having the same function. A detailed description of known functions and constructions unnecessarily obscuring the subject matter of the present invention may be omitted for clarity.

Analog amplification or attenuation is typically needed in the received path of most digital modems to fully utilize the available digital dynamic range. Typically, the gain adjustment depends on the particular channel conditions, therefore, an automatic gain control (AGC) algorithm is preferable. Of particularly interested is the type of distributed arrangement of filters and programmable gain amplifier (PGA) stages as depicted in FIG. 1. The arrangement of alternating filters (H1, H2 and H3) and PGAs (PGA1, PGA2 and PGA3) in a receive path from a hybrid circuit to a processor is common in AFE designs where the intermediate points in the analog chain are inaccessible. It is understood that other numbers of filters and PGAs are contemplated. One of the limitations of this structure is that saturation of the intermediate stages can be difficult to detect in the processor, such as a DSP 10, because of the distributed filtering. For instance, such conditions occur for scenarios of poor echo rejection in the associated hybrid circuitry or in the presence of strong out-of-band interferers. To mitigate this effect, the AGC approach of the present invention estimates the out-of-band energy while the modem on the other side of the line is "quiet" and enables appropriate actions to minimize saturation. Further, the AGC approach of the present invention can be executed by the processor or DSP 10.

In the discussion that follows, we assume that the AGC algorithm runs in a client-side ADSL modem and that the dominant out-of-band interferer is self transmit echo. However, the technique is not restricted to FDM ADSL as it can also be used for echo cancelled (EC)-based ADSL, or pseudo-EC ADSL. The client and central office modems are referred to as RT and CO, respectively, and are compliant with the ANSI T1.413 specification the disclosure of which in hereby incorporated by reference.

Figure 3:
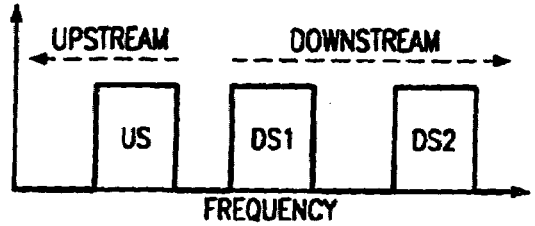
FIG. 3 illustrates a graphical representation of frequency domain analysis regions in accordance with an exemplary embodiment of the present invention.

In accordance with an exemplary embodiment of the present invention, the AGC algorithm has the following three stages; transmit echo estimation, channel slope estimation, and time domain AGC. The AGC algorithm can be executed as instructions by a processor, such as a DSP. During the transmit echo estimation stage, the AGC algorithm estimates the transmit echo energy. This is performed in the frequency domain by averaging the received energy in the lower frequencies or upstream band, denoted "US" in FIG. 3 and, preferably, during a portion of the training sequence between the RT and CO in which the CO transmits a non-signal in a REVERB1 type stage. The estimated energy is directly associated with the amount of echo rejection achieved by the hybrid circuitry and can be used to identify different loop conditions as affected by bridge taps. For example, a predetermined or theoretical model for line loops and the affect of bride taps can be used and correlated with the spectrum received in the DSP 10. This information is used during the time domain portion of the AGC algorithm (further discussed below) to adjust the gain distribution assignment accordingly.

Figure 2:
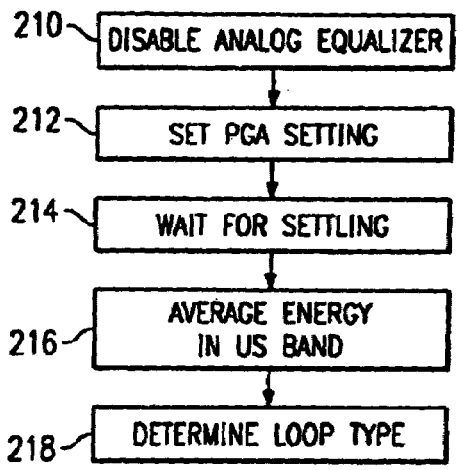
FIG. 2 illustrates a method flow diagram of a transmit echo estimation stage according to an exemplary embodiment of the present invention.

Referring now to FIG. 2 there is illustrated a method flow diagram of the transmit echo estimation stage according to an exemplary embodiment of the present invention. In the first shown act, the analog equalizer is disabled 210. An analog equalizer setting associated with the channel slope is determined in a operation discussed in the channel slope estimation stage of the AGC algorithm. The analog equalizer can be located in several locations depending on the specific detector architecture. For the architecture shown in FIG. 1, the analog equalizer is located in filter H3.

Further, the PGA settings are selected 212 to an appropriately high gain such that the transmit echo is detectable in the received signal. That is, the PGA settings are selected 212 so that the dynamic range of the analog-to-digital converter 12 is fully utilized giving the DSP 10 a good approximation of the analog signal. Following setting the PGAs, wait a period of time 214 to enable the PGAs to settle down. Generally, the time period can vary depending on the designer and the use of specific analog components.

Subsequently, the energy in the upstream frequency band is measured and averaged 216 over a number of frames. The number of frames used for this filtering type process can vary depending on the time available and/or the computing power available. Using the measured averaged energy, the loop type is determined or identified 218. The loop type can be identified, for example, using the above-described correlation scheme.

Certain AFE designs incorporate analog equalizer(s) with different amplification slopes (e.g., 5, 10, 15 dB/MHz). Since the DSL channel slope is directly associated with the loop length, which at the same time translates to channel attenuation, an analog equalizer setting can be chosen based on the signal strength of the received signal. However, this simple approach does not result in appropriate analog equalizer settings in many loop conditions. An improved approach, is to set the analog equalizer based on the channel slope at hand which can also be estimated during training sequence. Specifically, in at least one embodiment of the present invention, the channel slope estimation stage of the AGC algorithm approximates the channel slope by averaging the received energy in two different regions of the received or downstream band, illustrated as DS1 and DS2 in FIG. 3. DS1 should be a region on the low end of the downstream band and DS2 should be a region on the high end of the downstream band. The ratio of these two quantities is directly associated with the channel slope and is used to select the analog equalizer setting accordingly. This approach of estimating the slope is a low-complexity approximation of the more precise approach of finding the slope of a line that best fit the channel frequency response.

Figure 4:
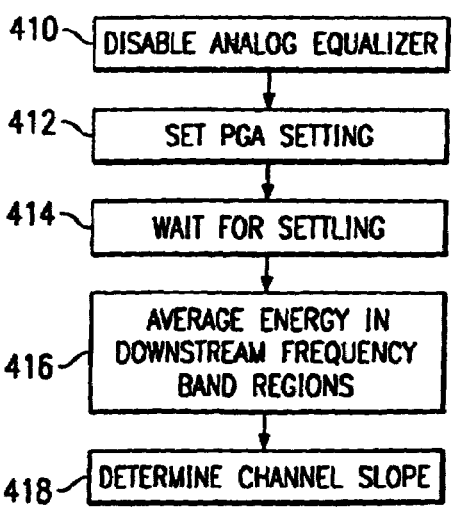
FIG. 4 illustrates a method flow diagram of a channel slope estimation stage in accordance with an exemplary embodiment of the present invention.

Referring now to FIG. 4 there is illustrated a method flow diagram of a channel slope estimation stage in accordance with an exemplary embodiment of the present invention. Firstly, the analog equalizer is disabled 410 and the PGA settings are set to an appropriately low gain such that the received signal is detectable without saturating the AFE 412. Subsequently, the PGA are allowed to settle down over a period of time 414. Generally, the time period can vary depending on the designer and the use of specific components. Next, the energy in the downstream frequency bands DS1 and DS2 is averaged over a number of frames 416. The number of frames used for this filtering type process can vary depending on the time available and/or the computing power available. The channel slope is estimated as the ratio of measured averaged energy of DS1 and DS2 and the analog equalizer is selected accordingly 418.

Figure 5A:
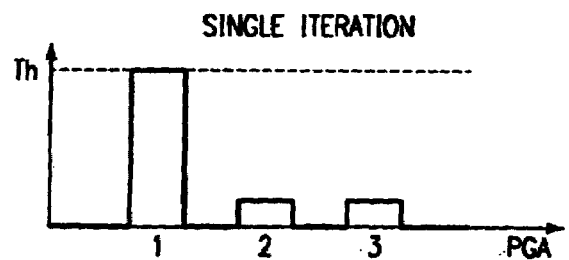
FIG. 5A shows a graph of a resulting gain distribution for one iteration of the time domain AGC algorithm in accordance with an exemplary embodiment of the present invention.
Figure 5B:
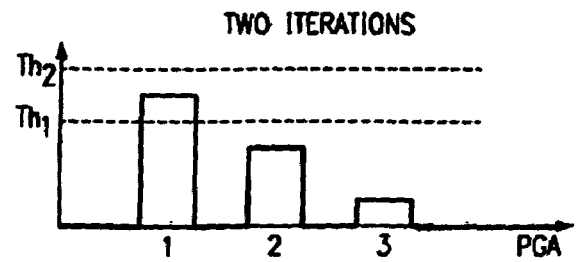
FIG. 5B shows a graph of a resulting gain distribution for two iteration of the time domain AGC algorithm in accordance with an exemplary embodiment of the present invention.

The time domain AGC stage of the AGC algorithm is also performed during the training sequence. The time domain AGC stage increases each of the PGA settings until the received signal (in the time domain) exceeds a given threshold (targetPeak) or until the maximum setting for that PGA has been reached. If the current PGA setting has been maximized, the next PGA is considered and the process is repeated until no additional gain is needed or until the available PGAs are exhausted. For only one iteration of the time domain AGC stage, the gain distribution is heavily weighted towards the first PGA considered, as illustrated in FIG. 5A. In some applications, this distribution may cause undesirable saturation. To mitigate this effect, in accordance with an embodiment of the present invention, the time domain AGC stage is iterated with different maximum PGA settings for each iteration. This iterative approach results in a more uniform gain distribution, as illustrated in FIG. 5B for two-iterations. Th1 and Th2 are the maximum PGA settings for the first and second iteration, respectively, where the maximum PGA setting is increased for each successive iteration. It should be noted that many iterations can be used with corresponding higher maximum settings for each successive iteration Thus, Th1<Th2<Th3<. . . .

The TargetPeak is typically measured in dB with respect to the maximum digital quantity available to the processor. At the same time, this maximum digital quantity is related to the analog to digital converter (ADC) resolution, for example, a N-bit ADC represent analog signals in the digital domain with a range from $-2^{(N-1)}$ to $(2^{(N-1)})-1$. The TargetPeak in dB should be equal to the PAR difference in dB of the training and showtime signals.

Although a more uniform gain distribution is mostly desirable, in addition, it is beneficial to control which of the PGAs will result with the highest gain setting. For instance, loop types severely limited by transmit echo benefit from a gain distribution weighted towards the PGA farthest from the hybrid, e.g., PGA3 in FIG. 1. For example, if the line changes because of bridge taps, the hybrid circuit is not able to match the impedance very well and the RT transmit echo increases. Thus, in this case, performance is improved with a gain distribution weighted towards the later stages. On the other hand, loop types with good echo rejection are better served with a gain distribution weighted towards the closest PGA to the hybrid, e.g., PGA1 in FIG. 1. This control is advantageously achieved by changing the order in which the time domain AGC stage considers the different PGAs. These loop types can be identified by the above-described transmit echo estimation stage and the order in which the PGAs are considered is selected accordingly.

Figure 6:
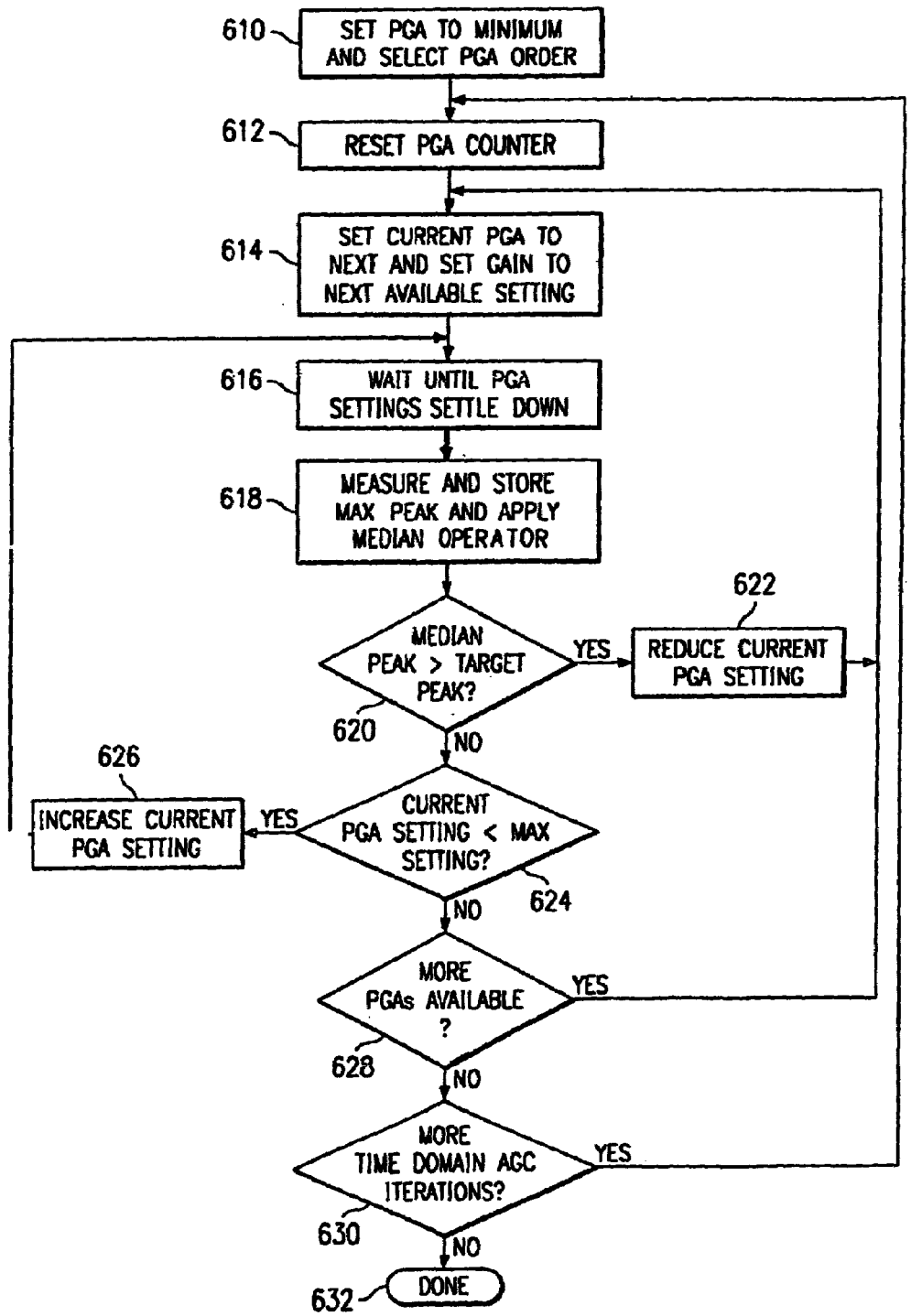
FIG. 6 illustrated a flow diagram of a time domain AGC stage of the AGC algorithm in accordance with an exemplary embodiment of the present invention.

Referring now to FIG. 6 there is illustrated a flow diagram of a time domain AGC stage of the AGC algorithm in accordance with an exemplary embodiment of the present invention. Firstly, the PGAs are set to their minimal gain setting and the PGA order list is selected 610. As abovementioned, the PGA order list can be determined according to the transmit echo estimate calculated in the transmit echo estimation stage. For each time domain AGC stage iteration, a PGA counter is reset 612. Subsequently, the PGA selected to the next available in the PGA order list and the next available setting for the PAGA is set 614. Note that a maximum setting for the PGAs may increase with the iteration number and are increased in a preferred embodiment. The PGA is then given a period of time to settle down 616. Following the settling down period, the maximum peak for a number of frames of the downstream signal is measured and stored, and a median operator is applied to the stored peaks 618 in which the resulting value is stored as the "medianPeak". It should be noted that the median operator is used to filter outliers in the peak data, other smoothing operators, like the mean, can be used as well.

If medianPeak is greater than a predetermined target (targetPeak) 620, the current PGA gain setting is reduced by one 622 and flow passes back to act 614, otherwise, flow passes to act 624. It should be pointed out that the digital headroom between the targetPeak and the maximum representable value should be greater than the peak-to-average ratio (PAR) difference between the AGC training sequence and the "showtime" signal.

In act 624, if the current PGA setting is lower than maxPgaSetting, the current PGA gain setting is increased by one 626 and control is passed back to act 616. If the current PGA setting is not lower than maxPgaSetting, flow continues to act 628 to determine if more PGAs are available to consider. If there are more PGAs available, flow is passed to act 614. If there are no more PGAs to consider, a determination is made for more iterations 630 in which a positive response returns flow to 612 for the next iteration. If there are no more time domain AGC stage iterations the process is complete 632.

As an example, Table 1 below illustrates the time domain AGC stage approach for three gain stages and two iterations (assume a gain or 19 dB is needed). The gain stages have five 3 dB/step settings or incremental settings (0 through 4). The minimum setting for all PGAs is 0 and the maximum setting for the first and second iterations are 2 and 4, respectively.

TABLE 1

| Iteration | Cycle | PGA1 setting (gain) | PGA2 setting | PGA3 setting | Total gain |
|---|---|---|---|---|---|
| 1 | 0 | 0(0 dB) | 0(0 dB) | 0(0 dB) | 0 dB |
| 1 | 1 | 1(3 dB) | 0(0 dB) | 0(0 dB) | 3 dB |
| 1 | 2 | 2(6 dB) | 0(0 dB) | 0(0 dB) | 6 dB |
| 1 | 3 | 2(6 dB) | 1(3 dB) | 0(0 dB) | 9 dB |
| 1 | 4 | 2(6 dB) | 2(6 dB) | 0(0 dB) | 12 dB |
| 1 | 5 | 2(6 dB) | 2(6 dB) | 1(1 dB) | 13 dB |
| 1 | 6 | 2(6 dB) | 2(6 dB) | 2(2 dB) | 14 dB |
| 2 | 7 | 3(9 dB) | 2(6 dB) | 2(2 dB) | 17 dB |
| 2 | 8 | 4(12 dB) | 2(6 dB) | 2(2 dB) | 20 dB |
| 2 | 9 | 3(9 dB) | 3(9 dB) | 2(2 dB) | 20 dB |
| 2 | 10 | 3(9 dB) | 2(6 dB) | 3(3 dB) | 18 dB |
| 2 | 11 | 3(9 dB) | 2(6 dB) | 4(4 dB) | 19 dB |

Final gain settings: PGA1 = 3(9 dB), PGA2 = 2(6 dB), PGA3 = 4(1 dB)

Table 2 shows a single iteration example with a maximum setting of 5.

TABLE 2

| Iteration | Cycle | PGA1 setting (gain) | PGA2 setting | PGA3 setting | Total gain |
|---|---|---|---|---|---|
| 1 | 0 | 0(0 dB) | 0(0 dB) | 0(0 dB) | 0 dB |
| 1 | 1 | 1(3 dB) | 0(0 dB) | 0(0 dB) | 3 dB |
| 1 | 2 | 2(6 dB) | 0(0 dB) | 0(0 dB) | 6 dB |
| 1 | 3 | 3(9 dB) | 0(0 dB) | 0(0 dB) | 9 dB |
| 1 | 4 | 4(12 dB) | 0(0 dB) | 0(0 dB) | 12 dB |
| 1 | 5 | 4(12 dB) | 1(3 dB) | 0(0 dB) | 15 dB |
| 1 | 6 | 4(12 dB) | 2(6 dB) | 0(0 dB) | 18 dB |
| 1 | 7 | 4(12 dB) | 3(9 dB) | 0(0 dB) | 21 dB |
| 1 | 8 | 4(12 dB) | 2(6 dB) | 1(1 dB) | 19 dB |

Final gain settings: PGA1 = 4(12 dB), PGA2 = 2(6 dB), PGA3 = 1(1 dB)

Although a preferred embodiment of the apparatus and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for gain control in a digital subscriber line system comprising an analog front end with a plurality of interleaved gain and filter stages, comprising the sequential acts of:
    selecting and order for said gain stages to be considered;
    initializing each of said plurality of gain stages to respective minimal gain setting,
    wherein each gain stage has a plurality of incremental gain settings; and for a first iteration of each gain stage in said selected order;
    increasing a corresponding gain setting by one increment;
    determining a peak average of a plurality of data frames received by said analog front end for a present gain setting; and
    if said peak average is greater than a peak target, reduce said gain setting by one increment and proceed to a next gain stage in said selected gain stage order;
    otherwise increase said gain setting by one increment and return to said act of determining a current peak average, wherein said selecting an order for said gain stages to be considered further comprises; determining a loop type of said subscriber line system; and selecting a gain stage order corresponding to said loop type.

2. The method of claim 1 further including resetting a gain stage counter to begin with a first gain stage in said selected.

3. The method of claim 1 further including waiting a time period for determining said peak average following a change in a gain setting.

4. The method of claim 1, wherein said determining a peak average comprises:
    determining a maximum peak for said plurality of data frames; and
    applying a median operator to said determined maximum peak for providing said peak average.

5. The method of claim 1 further including a second iteration of each gain stage in said selected order comprising the sequential acts of:
    increasing a maximum gain setting; and
    repeating said first iteration of each gain stage.

6. The method of claim 1 further including a plurality of subsequent iterations each comprising:
    increasing said maximum gain setting; and
    repeating said first iteration of each gain stage.

7. The method of claim 5 further including waiting a time period for determining said peak average following a change in a gain setting.

8. The method of claim 5, wherein said determining a peak average comprises:
    determining a maximum peak for said plurality of data frames; and
    applying a median to said determined maximum peak for providing said peak average.

9. A method for selecting a gain distribution for a plurality of interleaved programmable gain amplifiers of an analog front end in a digital subscriber line system, comprising:
    selecting a sequential order for which programmable gain amplifiers are determined;
    initiating each of said programmable gain amplifier settings to a lowest setting, wherein each said programmable gain amplifier has a plurality of incremental gain settings which include a maximum setting; and
    for a first iteration beginning with a first of said selected sequential order and repeating for each programmable gain amplifier;
    selecting a highest incremental gain setting which provides a nonsaturated signal condition, wherein said signal condition is determined by a peak average for a plurality of data frames received by said analog front end,
    wherein said selecting a sequential order further comprises: determining a llop type of said digital subscriber line system; and selecting a predetermined sequential order corresponding to said loop type.

10. The method of claim 9 further including a second iteration beginning with a first of said selected sequential order and repeating for each programmable amplifier:
    increasing said maximum setting by at least one incremental setting; and
    selecting a highest incremental gain setting which provides a nonsaturated signal condition.

11. The method of claim 10, wherein said selecting a sequential order further comprises:
    determining a loop type in said digital subscriber line system; and
    selecting a predetermined sequential order corresponding to said loop type.

12. The method of claim 9 further including a plurality of subsequent iterations each comprising:
    increasing said maximum setting by at least one incremental setting; and
    repeating said first iteration.

13. An apparatus for selecting a gain distribution in a subscriber line system, comprising:
    an analog front end having a plurality of serially coupled gain stages and adapted to receive a data signal;
    an analog-to-digital converter adapted to receive a data signal from said analog front end; and
    a processor coupled to said analog-to-digital converter and adapted to determine a loop type of said subscriber line system and select a gain setting of each of said gain stages in a predetermined order corresponding to said loop type, said processor further adapted to execute instructions for selecting a highest incremental gain setting which provides a nonsaturated signal condition based on a peak average for a plurality of data frames received by said analog front end.

14. The apparatus of claim 13, wherein said gain stages comprise programmable gain amplifiers.

15. The apparatus of claim 13, wherein said processor comprises a digital signal processor.

* * * * *